United States Patent
Klusza et al.

(10) Patent No.: US 10,448,000 B2
(45) Date of Patent: *Oct. 15, 2019

(54) HANDHELD PORTABLE OPTICAL SCANNER AND METHOD OF USING

(71) Applicant: DotProduct LLC, Houston, TX (US)

(72) Inventors: Mark Klusza, Houston, TX (US); Rafael Spring, Wiesbaden (DE)

(73) Assignee: DOTPRODUCT LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/079,367

(22) Filed: Mar. 24, 2016

(65) Prior Publication Data
US 2016/0210753 A1 Jul. 21, 2016

Related U.S. Application Data

(63) Continuation of application No. 13/839,987, filed on Mar. 15, 2013, now Pat. No. 9,332,243.
(Continued)

(51) Int. Cl.
*G06T 17/00* (2006.01)
*H04N 13/271* (2018.01)
(Continued)

(52) U.S. Cl.
CPC .......... *H04N 13/271* (2018.05); *G06T 7/521* (2017.01); *G06T 7/579* (2017.01); *G06T 7/73* (2017.01);
(Continued)

(58) Field of Classification Search
CPC ... G06T 7/0042; G06T 7/0057; G06T 7/0071; G06T 7/408; G06T 17/00; G06T 19/006;
(Continued)

(56) References Cited

U.S. PATENT DOCUMENTS

| 7,003,136 B1 | 2/2006 | Harville et al. |
| 7,199,793 B2 | 4/2007 | Oh et al. |

(Continued)

FOREIGN PATENT DOCUMENTS

| CN | 1669045 A | 9/2005 |
| CN | 101271469 A | 9/2008 |

(Continued)

OTHER PUBLICATIONS 13848064.5, "European Application Serial No. 13848064.5, Extended European Search Report dated May 27, 2016", Dotproduct LLC, 10 Pages.
(Continued)

*Primary Examiner* — Christopher G Findley
(74) *Attorney, Agent, or Firm* — GTC Law Group PC & Affiliates

(57) ABSTRACT

A system and methods for real-time or near-real time processing and post-processing of RGB-D image data using a handheld portable device and using the results for a variety of applications. The disclosure is based on the combination of off-the-shelf equipment (e.g. an RGB-D camera and a smartphone/tablet computer) in a self-contained unit capable of performing complex spatial reasoning tasks using highly optimized computer vision algorithms. New applications are disclosed using the instantaneous results obtained and the wireless connectivity of the host device for remote collaboration. One method includes steps of projecting a dot pattern from a light source onto a plurality of points on a scene, measuring distances to the points, and digitally reconstructing an image or images of the scene, such as a 3D view of the scene. A plurality of images may also be stitched together to re-position an orientation of the view of the scene.

20 Claims, 10 Drawing Sheets

Related U.S. Application Data

(60) Provisional application No. 61/715,223, filed on Oct. 17, 2012.

(51) Int. Cl.

| | | |
|---|---|---|
| *H04N 13/106* | (2018.01) | |
| *H04N 13/207* | (2018.01) | |
| *H04N 13/254* | (2018.01) | |
| *G06T 19/00* | (2011.01) | |
| *G06T 7/73* | (2017.01) | |
| *G06T 7/521* | (2017.01) | |
| *G06T 7/579* | (2017.01) | |
| *G06T 7/90* | (2017.01) | |

(52) U.S. Cl.
CPC .............. *G06T 7/90* (2017.01); *G06T 17/00* (2013.01); *G06T 19/006* (2013.01); *H04N 13/106* (2018.05); *H04N 13/207* (2018.05); *H04N 13/254* (2018.05); *G06T 2200/04* (2013.01); *G06T 2200/08* (2013.01); *G06T 2207/10012* (2013.01); *G06T 2207/10016* (2013.01); *G06T 2207/10024* (2013.01); *G06T 2207/10028* (2013.01); *G06T 2207/20016* (2013.01); *G06T 2207/30244* (2013.01)

(58) Field of Classification Search
CPC ........... H04N 13/0007; H04N 13/0207; H04N 13/0253; H04N 13/0271
See application file for complete search history.

(56) References Cited

U.S. PATENT DOCUMENTS

| | | | |
|---|---|---|---|
| 8,121,350 B2* | 2/2012 | Klefenz | G01C 21/00 |
| | | | 348/148 |
| 8,731,247 B2 | 5/2014 | Pollock | |
| 8,902,254 B1* | 12/2014 | Laughlin | G06T 19/006 |
| | | | 345/633 |
| 2004/0095357 A1 | 5/2004 | Oh et al. | |
| 2006/0110026 A1 | 5/2006 | Strassenburg-Kleciak et al. | |
| 2007/0206204 A1 | 9/2007 | Jia et al. | |
| 2008/0012850 A1 | 1/2008 | Keating, III | |
| 2010/0008593 A1 | 1/2010 | Gruetzmacher et al. | |
| 2011/0110560 A1 | 5/2011 | Adhikari et al. | |
| 2011/0187829 A1 | 8/2011 | Nakajima | |
| 2012/0076403 A1 | 3/2012 | Nestares et al. | |
| 2012/0147152 A1 | 6/2012 | Vogiatis et al. | |
| 2012/0182393 A1 | 7/2012 | Yagi et al. | |
| 2012/0194644 A1 | 8/2012 | Newcombe et al. | |
| 2012/0201469 A1* | 8/2012 | Livet | G06K 9/6202 |
| | | | 382/201 |
| 2012/0300979 A1* | 11/2012 | Pirchheim | G06T 7/0042 |
| | | | 382/103 |
| 2013/0002649 A1* | 1/2013 | Wu | G06T 19/006 |
| | | | 345/419 |
| 2013/0063549 A1 | 3/2013 | Schnyder et al. | |
| 2013/0147789 A1* | 6/2013 | Kim | G06T 17/00 |
| | | | 345/419 |
| 2013/0286017 A1 | 10/2013 | Marimon Sanjuan et al. | |
| 2013/0300740 A1* | 11/2013 | Snyder | G06F 3/016 |
| | | | 345/420 |
| 2013/0335417 A1* | 12/2013 | McQueston | A61B 6/145 |
| | | | 345/424 |
| 2014/0104387 A1 | 4/2014 | Klusza et al. | |
| 2014/0225985 A1 | 8/2014 | Klusza et al. | |

FOREIGN PATENT DOCUMENTS

| | | |
|---|---|---|
| CN | 101627635 A | 1/2010 |
| CN | 102253711 A | 11/2011 |
| CN | 102681661 A | 9/2012 |
| KR | 1020010031686 A | 4/2001 |
| WO | 2014062874 A1 | 4/2014 |
| WO | 2014172484 A1 | 10/2014 |

OTHER PUBLICATIONS 14785573.8, "European Application Serial No. 14785573.8, Extended European Search Report dated Nov. 17, 2016", DotProduct LLC, 12 Pages.
Henry, et al., "RGB-D mapping: Using Kinect-style depth cameras for dense 3D modeling of indoor environments", The International Journal of Robotics Research, vol. 31, No. 5, Feb. 10, 2012, p. 647-663.
Lieberknecht, et al., "RGB-D Camera-Based Parallel Tracking and Meshing", Oct. 26, 2011, p. 147-155.
PCT/US2013/065358, "International Application Serial No. PCT/US2013/065358, International Preliminary Report on Patentability and Written Opinion dated Apr. 30, 2015", Dotproduct LLC, 10 Pages.
PCT/US2013/065358, "International Application Serial No. PCT/US2013/065358, International Search Report and Written Opinion dated Jan. 28, 2014", Dotproduct LLC, 15 Pages.
PCT/US2014/034406, "International Application Serial No. PCT/US2014/034406, International Preliminary Report on Patentability and Written Opinion dated Oct. 29, 2015", Dotproduct LLC, 6 Pages.
PCT/US2014/034406, "International Application Serial No. PCT/US2014/034406, International Search Report and Written Opinion dated Aug. 25, 2014", Dotproduct LLC, 9 pages.
Popescu, et al., "The ModelCamera: a Hand-Held-Device for Interactive Modeling", 3-D Digital Imaging and Modeling, 2003. 3DIM 2003. Proceedings. Fourth International Conference on Oct. 6-10, pp. 285-292.
Remondino, et al., "Image-Based 3D Modelling: A Review", The Photogrammetric Record, vol . 21, No. 115, pp. 269-291.
Strasdat, et al., "Double Window Optimisation for Constant Time Visual SLAM", Nov. 6, 2011, p. 2352-2359.
Tykkala, et al., "Live RGB-D Camera Tracking for Television Production Studios", conditionally accepted in Elsevier Journal of Visual Communication and Image Representation Open Access Solutions Journal of Visual Communication and Image Representation, Dec. 12, 2012, 13 pages.
Henry, et al., "RGB-D mapping: Using Kinect-style depth cameras for dense 3D modeling of indoor environments", DotProduct LLC, 17 Pages.

* cited by examiner

System Block Diagram

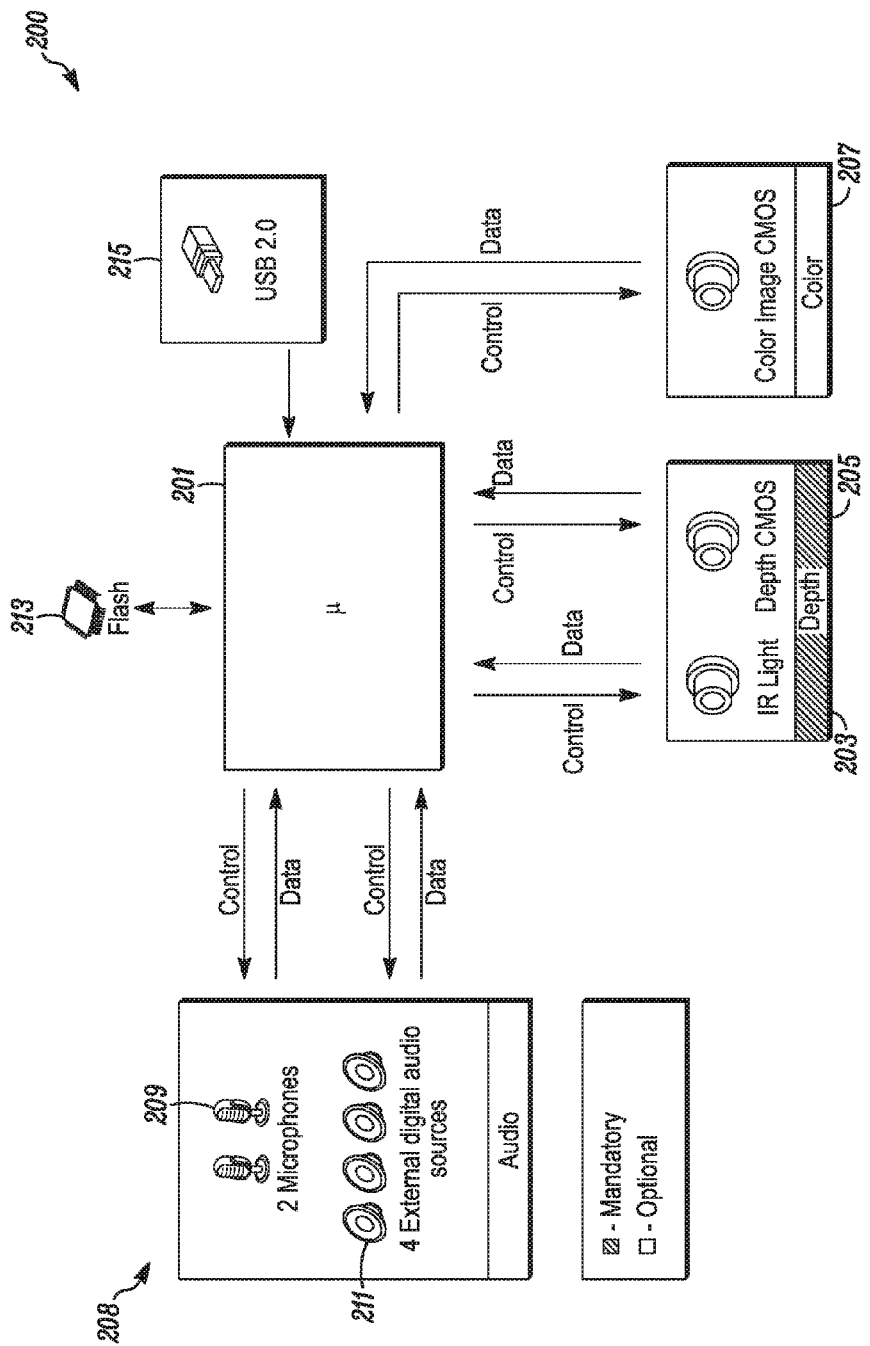
FIG. 2A Block diagram of the components in a PrimeSense image capture and depth map determiner Block diagram of the components in a PrimeSense image capture and depth map determiner

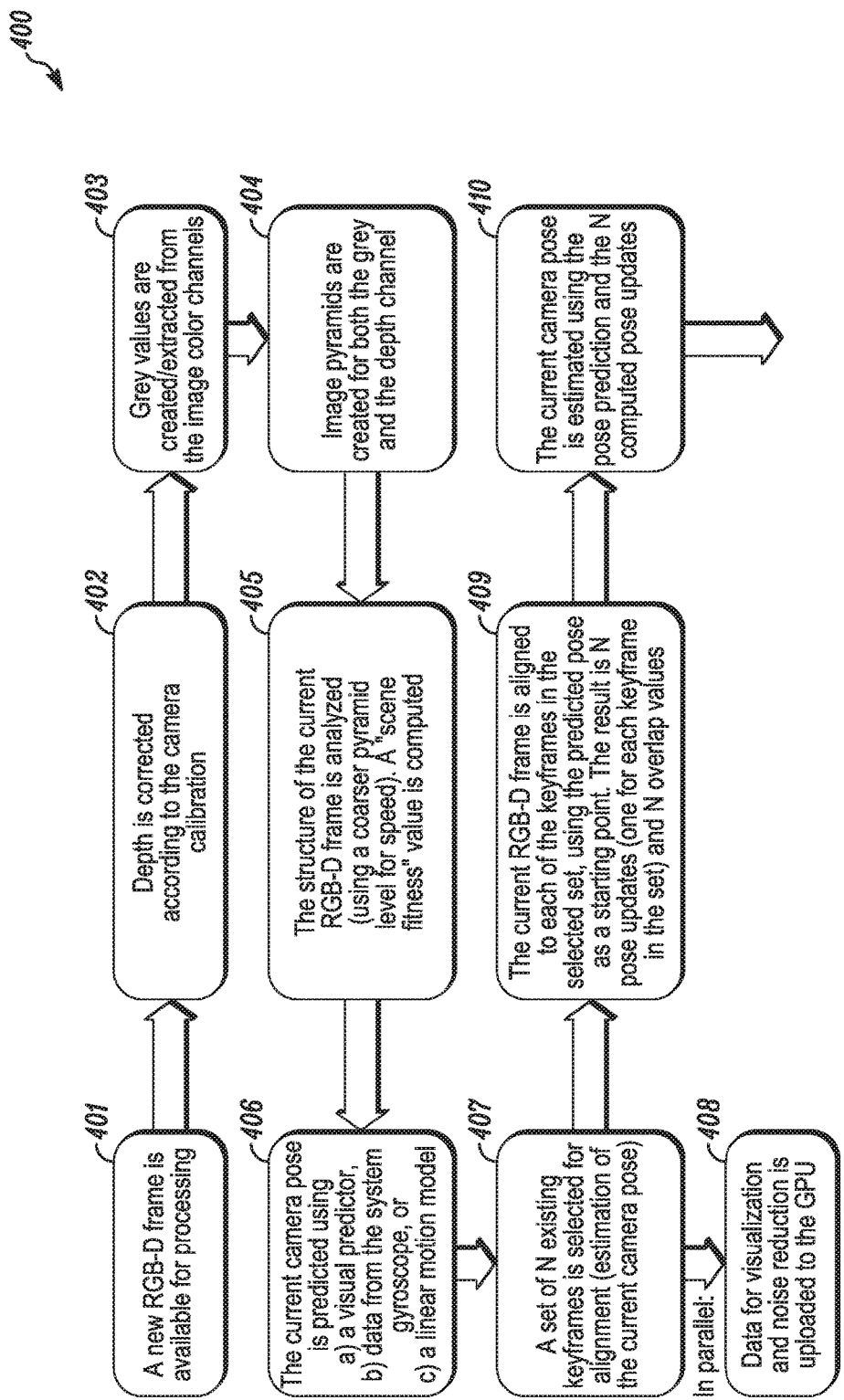
FIG. 4A Flowchart for internal operational steps for image capture and image processing Flowchart for internal operational steps for image capture and image processing Flowchart for internal operational steps for image capture and image processing Alternate Flow Chart for internal operational steps for image capture and image processing

| 140 | Computer Vision and Scanning Suite | 145 | Result Post - Processing |
|---|---|---|---|
| 141 | Image Capture and Pre-Processing | | |
| 142 | Real-time RGB-D Image Visualization | 190 | Imager Calibration Suite |
| 143 | Real-time alignment / 3d modeling | 191 | Calibration of projective images |
| 144 | Real-time Results Display / AR | 192 | Calibration of depth for structured light systems |
| | | | |
| 160 | Image/3d Data Management | | |
| 161 | 3D Modeler for real time display of captured image/data stream | 167 | Raw Data Transfer of Image & Depth data to remote site |
| 162 | Add virtual [AR] model from stored CAD/3D model to current scene | 168 | Geo-Reference Point Insertion into selected point in local scene |
| 163 | Shape Extractor and Exporter | 169 | New Data Addition to Current 3D Model |
| 164 | Comparer to show differences between captured image/data and model | 170 | Surface Angle Extractor |
| 165 | Scene Exporter for use in external model | 171 | Display Control for GUI |
| 166 | Real-Time Data Streaming to external viewer | 172 | Post-Capture Results Visualization |

List of programs

*FIG. 5*

HANDHELD PORTABLE OPTICAL SCANNER AND METHOD OF USING

CLAIM TO PRIORITY

This application is a continuation of U.S. patent application Ser. No. 13/839,987 (DOTP-0001-U01) filed on Mar. 15, 2013 which claims priority to U.S. Provisional Patent Application Ser. No. 61/715,223 (DOTP-0001-P01) filed on Oct. 17, 2012.

Each of the above applications is hereby incorporated by reference in its entirety.

FIELD OF THE DISCLOSURE

The field of this disclosure is that of a system and method for obtaining image data via a handheld portable optical imaging scanner and for methods of processing the image and depth data via a variety of methods.

BACKGROUND

This technique finds its root in imaging systems.

SUMMARY

One embodiment is a handheld imaging system for capturing a multiplicity of images of a scene and determining a precise location of a plurality of points in each image in a coordinate system, in real time. The system includes an image capture device for capturing and storing a plurality of digital images, a depth computation system for deriving depth information for a plurality of arbitrary points in the images in real time, a handheld computer system having a processor, a display with user interface controls, and a communications module, wherein the processor is in communication with said image capture device and a depth computation system. The system also includes a non-transitory computer readable medium having encoded thereon a set of instructions executable by the processor to cause the image capture device, the spot location system and the communications module to perform one or more operations, the instructions including capturing a plurality of digital images in digital data of a scene and capturing a location for a plurality of points in said scene from the image capture device and from the depth computation system, storing said digital data, combining the plurality of images together to form a single 3D model, displaying the single 3d model in the mobile handheld device, and manipulating the digital file data of the single 3D model according user-based inputs to a processing and control system.

Another embodiment is a method for taking a plurality of images. The method includes steps of capturing a plurality of digital images in digital data of a scene and capturing a location for a plurality of points in said scene from the image capture device and from a spot location system, storing said digital data, combining the plurality of images together to form a single 3D model, displaying the single 3d model in the mobile handheld device, and manipulating the digital file data according user-based inputs to a processing and control system.

Yet another embodiment is a handheld imaging system for capturing a multiplicity of images of a scene and determining a precise location of a plurality of points in each image in a coordinate system, in real time. The system includes an image capture device for capturing and storing a plurality of digital images, a depth computation system for deriving depth information for a plurality of arbitrary points in the images in real time, a handheld computer system having a processor, a display with user interface controls, and a communications module, wherein the processor is in communication with said image capture device and the spot location system. The system also includes a non-transitory computer readable medium having encoded thereon a set of instructions executable by the processor to cause the image capture device, the spot location system and the communications module to perform one or more operations, the instructions for capturing a plurality of digital images in digital data of a scene and capturing a location for a plurality of arbitrary points in said scene from the image capture device and from the spot location system, storing said digital data, combining the plurality of images together to form a single 3D model, and manipulating the digital file data according user-based inputs to a processing and control system, wherein said manipulation step includes relating the camera location and pose to a real-world coordinate reference system.

These examples are not intended to be limiting, but rather illustrative of the capabilities of our system.

BRIEF DESCRIPTION OF THE DRAWINGS

The disclosure and the following detailed description of certain embodiments thereof may be understood by reference to the following figures:

FIGS. 2A-2B depict system block diagrams for embodiments of components of the present disclosure including an image capture and depth map determiner.

FIGS. 4A-4D depict a series of flowcharts for the internal steps performed by the image capture operating system in deriving a three-dimensional representation of a scene.

FIG. 5 is a list of the various programs in several embodiments of the disclosure.

DETAILED DESCRIPTION OF THE DISCLOSURE

The following is a written description of the present disclosure, and of the manner and process of making and using it, in such full, clear, concise, and exact terms as to enable any person skilled in the art to which it pertains, or with which it is most nearly connected, to make and use the same, and sets forth the best mode contemplated by the inventors of carrying out the disclosure.

Image capture systems for use in documenting the as-built condition of a structure or the shape and contours of an object are well-known in the arts. However, most do not operate in real time and are not configured for intensive image manipulation in the field. This disclosure includes a portable, handheld 3D image capturing system that enables creation of ready-to-use 3D models in seconds. The system of the present disclosure provides high resolution, real-time 3D images with high frame rate of capture. Thus, it is capable of capturing scenes with moving parts, or when the image capture device itself is in motion. High precision location of objects and features are provided, with millimeter and sub-millimeter accuracy.

The workflow for operation and integration into the daily set of tasks involved in 3D image capture is streamlined and simplified, thus improving user productivity. The 3D image capture system is small, light-weight and extremely easy to use. A user can have a 3D model of a scene stored in memory and displayed on a local screen in a few seconds. Examples of typical workflows are shown in FIGS. 4A-4D.

Figure 1:
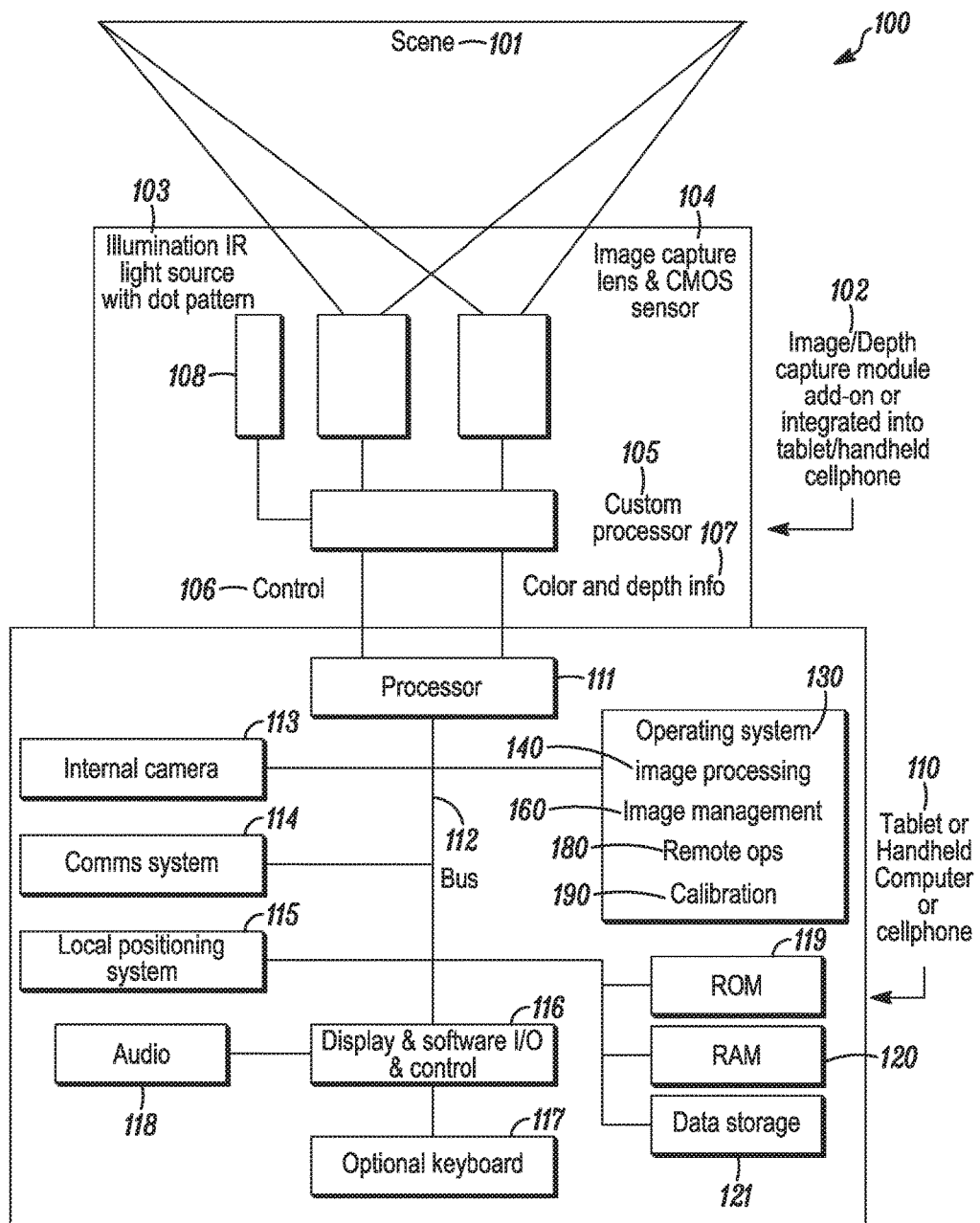
FIG. 1 depicts a system block diagram in an embodiment of the present disclosure.

The main components of the product are shown in FIG. 1, System Block diagram 100. The user desires to capture a scene of interest 101. The Image Capture and Depth Determiner 102 is used for capturing multiple images of a scene along with a depth map for each scene. A handheld tablet or smartphone 110 is used for implementing a 3D rendering system and operating the complete system. The tablet or smartphone is configured to enable a user to operate the image capture device, to obtain a data stream of images with depth map information for the image, which may include depth information for pre-determined spots in the image, and to perform any of a number of image manipulations based on additional software available to the tablet/smartphone computer. The handheld computer has programs for its internal operations and applications programs for managing the image capture and various processing tasks. Software for improved image processing 140 includes programs that can capture and deliver image and depth information, combine multiple images into a single 3d model for viewing, analyzing, and managing. Software for image and model manipulation and management in real time. 160 is another main embodiment of the disclosure. Additional software is available for performing many other functions on the captured and combined images, for a variety of purposes. The features and functions of each of these components are next described in detail.

Image Capture and Depth Map Determiner 102

In an embodiment, the 3D imager comprises a Red-Green-Blue—Depth (RGB-D) camera as the principal sensor, operated by and with a tablet computer or a smartphone. The camera is configured to operate with a Structured-Light depth map determination system. Alternatively, the camera may be configured to operate with a Time-of-Flight depth map generator. Sensors provide depth map data in real time using inexpensive components.

Structured Light depth map imaging systems are available from PrimeSense, an Israeli company which supplies components to the Microsoft Kinects system for detecting a user's body parts position and movements, as part of their product offerings. More information may be found at www.primesense.com. A specialized infrared light beam system 103 broadcasts a dot pattern toward a scene of interest, delivering a series of tiny dots that illuminate the objects in the scene. The number and spacing of the dots defines the resolution obtainable. An imager 104, similar to what is found in digital cameras, captures the scene and the illuminating dots in a special sensor, called the PS1080. Imager 104 includes an image capture lens and a CMOS sensor. The sensor derives a synchronized depth image, a color image, and optionally an audio data stream.

Figure 2B:
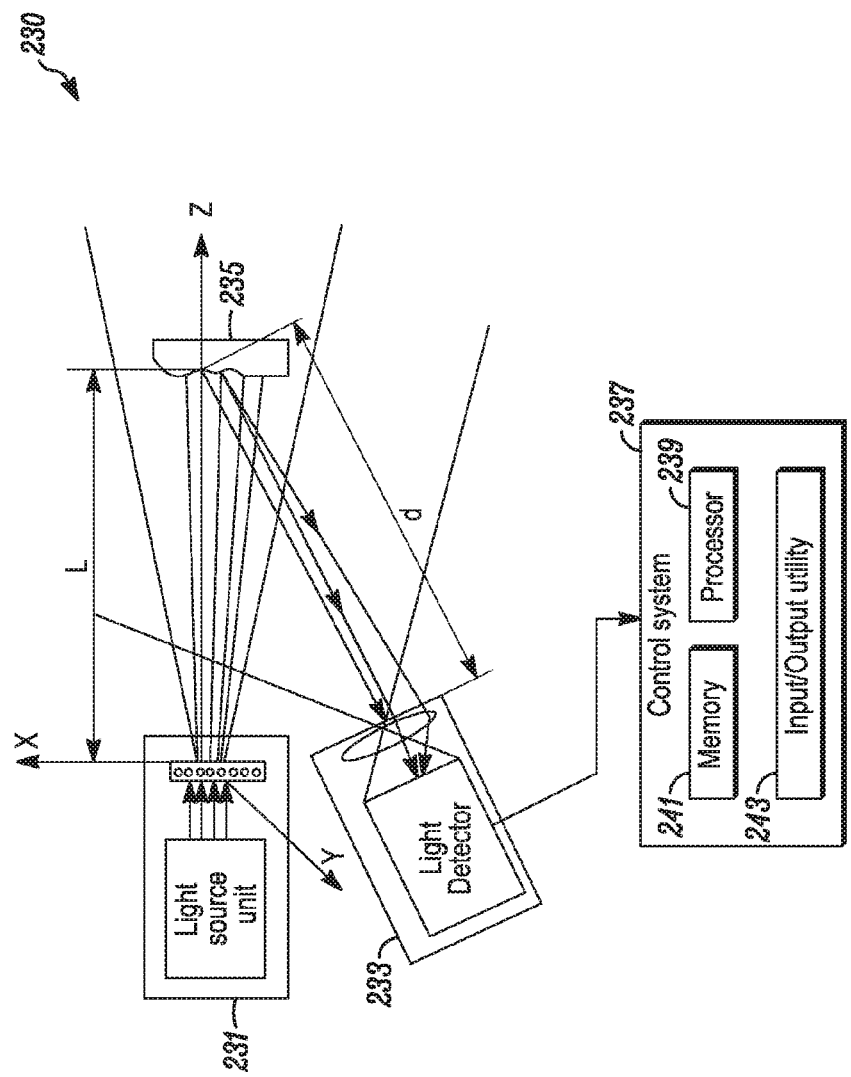

See FIGS. 2A-2B for additional details. FIG. 2A depicts a block diagram of the components of a PrimeSense image capture and depth map determiner 200. Components include a microprocessor 201, with an IR light transmitting capability 203 and a depth-determining CMOS functionality 205. If audio is desired, an audio section 208 may include one or more microphones 209 and one or more, possibly several, audio sources 211, for generating and detecting sound to accompany the image or images taken. The system may also include separate memory 213 or portable memory 215, such as the USB flash drive shown. The depth map is created in real time for each captured image. Module 102 may also include a custom processor 105, which may include a control portion 106 and storage 107 for color and depth information. FIG. 2B depicts a PrimeSense image capture and depth map determiner system 230. The system includes a light source 231 and light detector 233 to illuminate target of interest 235 and detect light reflected from the target 235. The system control 237 may include a microprocessor 239 with its own memory 241 and input/output systems 243.

Similarly, fully integrated sensors 108 for performing Time-of-Flight (TOF) distance measurements without any moving parts are available from the PMD Technologies Co. in Siegen, Germany. More information about these systems may be found at www.pmdtec.com. The sensor generates a modulated optical signal, and measures time of flight directly.

For example, the PMD PhotonICs 19k-S3 chipset obtains distance measurements to each pixel instantly, thus providing both a 3D representation of each pixel in view in the scene, as well as grey scale illumination data, simultaneously. Data from the chipset may be read out at rates of 15 MPixels/second. PMDTech also offers a complete camera system called the CamBoard, which is the first USB powered single board 3D TOF camera. Other companies with similar products include SoftKinetic and MESA Imaging. The capture rate for these sensors permits image frame capture at rates up to 60 frames/second (fps). These sensors do not provide the same level of resolution that more complicated and more expensive scanners can provide. However, with the combining system employed in various embodiments of the disclosure, many of the limitations are overcome.

Multiple image capture devices may be used and their data streams delivered to the handheld/tablet or smartphone computer device. Image capture devices from alternate suppliers may be employed to deliver image data as well. For example, robots carrying imagers can be employed in hard-to-reach places such as tunnels or sewer systems.

Handheld Tablet/Smartphone for Implementing a 3D Rendering System and Operating the Complete System In an embodiment of the present disclosure, the tablet computer, handheld computer, or smartphone shown at 110 serves as the user interface for controlling the image sensor and depth capture sensor subsystem 102. The tablet computer may be any of the products offered on the market such as the iPad by Apple Computer, the Galaxy III by Samsung, and many others. Similarly, an embodiment of the present disclosure may be realized with a smartphone such as an iPhone, offered by Apple Computer, or the Galaxy family of smartphones offered by Samsung, or various Android phones offered by the HTC company of Taiwan or the Razr offer by Motorola. All of these products contain an operating system 130 configured to run and manage the tablet itself, and to implement a host of applications such as those in embodiments of the present disclosure.

The essential elements of a handheld computer are the ability to operate it while holding it in one or two hands, without any additional support; to be able to see the resultant two-dimensional (2D) image as captured by the image/depth capture module 102, on a display 116; and to be able to input control information and commands via either a touch screen (also at 116) or an optional keyboard at 117. An audio output 118 is also desirable, if not absolutely necessary. The processor 111 available in current tablet computers has suitably fast clock operations, greater than 1.0-1.4 GHz, to facilitate real time operation of the image/depth capture system and process the image and depth data, to provide a visible image in near-real to real time. Additional features and functions common in most if not all of such handheld computers available today and connected on bus 112 may include a second internal camera 113, a communications system 114 further comprising at least one of a cellular telephony link, a cellular data link, and a Wi-Fi link.

Software such as Operating System 130 contains applications for operating these accessory functions, along with data management and storage in ROM 119, RAM 120, and Data storage 121, which may comprise an external memory device like a USB memory stick, or any other suitable non-volatile storage medium. Besides the operating system, software may include image processing software suite 140, image and data management software suite 160, and a suite of software for imager calibration 190. As outlined below, each of these may include a variety of separate programs. In an embodiment of the present disclosure, audio capture via the custom processor 105 and audio playback via software in the operating system 130 enable capture and playback of sounds during image capture as well. This feature facilitates verbal note-taking while performing the image data capture if so desired. While the computer may be handheld, a local positioning system 115 or aiming system may also be used.

Software for Image Capture and Rendering to Form a 3D Data Set

A number of software programs useful in the present disclosure are listed in FIG. 5. In an embodiment, image processing software 140 is provided for using a stream of RGB-D video frames to form the combined 3D data set. These include Program 141, Image Capture and Pre-processing, one of the group of applications 140, the Computer Vision and Scanning suite. For capturing and rendering, the suite includes a real-time RGB-D image visualization program, Program 142 shown in FIG. 5 as part of Image Processing suite 140. The software may be configured to operate on a portable handheld device like a tablet computer or a smartphone.

In an embodiment, new stitching or combining software is used to automatically merge two or more images together to form a composite 3d model. With this software tool, a model may be created from one or more images taken from different viewpoints in the scene. The result forms the basis for creating a panoramic image. This process is done in real-time, on-the-fly, so that the user can, at any time, view the formed 3d model, even during capturing, from a variety of viewpoints. This includes the current viewpoint of the attached camera, resulting in an Augmented-Reality-style visualization. The instant 3d model formation enables a user to see exactly where additional data points might be taken, and enables the user to point the camera to the desired region in need of more detail. In other words, holes in the image of the scene can be fixed on the fly. Additionally, the quality of the data in the scene can be assessed, and additional images from different viewpoints can be obtained as needed.

Elements of the software include suggestions for user-initiated actions to complete a portion of a scanned image, including directions to aim the image capture device. Because of the power of the combining algorithms used, including the capability of 3-D reconstruction, images obtained from other instruments with differing levels of detail may also be inputted into the tablet or smartphone computer system. The advantage of fast combining or modeling means that field adjustments and retakes can be done in near real-time with these other instruments as well as with the instant system. Image capture devices which also produce 3D depth maps along with greyscale or color images, such as those built by Trimble Navigation Limited, FARO, Z+F, and so forth may be inputted to this system.

The software provides an integrity metric to indicate when there is not enough data to perform a decent combining or 3-D modeling operation or to obtain registration of particular image with a previously declared registration point in the image. The declared registration point may be obtained from an arbitrary model, either from a Computer-Aided Design (CAD) model or a 3D point cloud model. The user interface is changed in a way that the user sees or is notified where there is not enough data captured in the scene as the scene is being combined or modeled.

In an embodiment, in Program 143 for example, the software is configured for real-time alignment of 3D derived data with an RGB image, thus putting a high-resolution photo image into spatial context with the 3D derived spatial data. In another embodiment, the software in Program 144 is configured to enable a user to compare the collected or imaged data to the RGB frame, showing the difference in a way or method that shows the user, on the User Interface (UI} where data does not match the RGB position. This may be due to an inability of the ranging system to extract the distance for each illumination dot in the image frame, based on the color, reflection or other environmental condition of the scene. This may be due to a variety of causes, such as lack of surface illumination, too much illumination, ripping or tearing of the surface edge, or a need for more image data. This may be done in real time with the results displayed and made available, for example, in an augmented reality (AR) situation. Program 145 includes additional capabilities for processing and registering images in post-processing operations, with capabilities for real-time results and displays with AR applications.

Software for Image Manipulation and Management in Real Time

A suite of software programs 160 are available to the user for performing a number of different operations on the captured and/or processed images with the associated 3D information. In one embodiment, a 3D Modeler software algorithm, Program 161 processes a real-time RGB-D, a range or depth map data stream on the handheld computer system, to create a 3D model of the recorded scene, as the user captures the data. The frames or a group of frames are used to reconstruct the scene as the device is moving through the scene. In contrast to the invention described in points 27 to 29 this point describes an invention where the formed 3d model is comprised of basic geometric primitives (polygons, planes, cylinders, boxes, etc. as used in common CAD systems) as opposed to consisting of individual 3d points. In constructing the 3D-primitive model not all points may be used from each frame, but the best points are selected, which could include all the points in the image as a reference for the stitching or registration from frame to frame or used when geo-referencing in other data as a registration anchor. The 3D Modeler program also may add its data to the RGB image data in a seamless combination. The 3D Modeler program may add its data to a pointcloud 3d model and/or a panoramic stitched image.

In program 162 (suite 160) an existing 3d CAD model or 3D point cloud model is obtained and displayed in a manner relating to the current scene capture. For example a virtual model can be registered with the just-captured, processed, and fused 3d model. For visualization a virtual camera is used that can take on any desired viewpoint. If the current viewpoint of the camera during capturing is used for visualization, the visualization mode is generally referred to as Augmented Reality (AR). The existing model may be downloaded via the communication link from a remote library or storage facility, as may be found in Cloud storage. In another embodiment, new data may be captured and added to an existing model. The user can select one or more points, or groups of points by selecting from the data of the scene as shown on the User Interface; alternatively, the user may select a pre-determined set of range data. The user can define known values in the data, example, a sphere or target of some known type that has either a current geo-referenced position or a point, group of points, or a derived location from a set of points into a known transform.

In another embodiment, software algorithms are provided to enable a user to extract known shapes or a particular geometry, such as Program 163 in suite 160, from a captured image of a scene, and to export a definition that allows the shape to be reconstructed on another remote device, like a desktop computer, or another smartphone or tablet. Alternatively, the extracted and modeled shape can be stored in a remote storage facility, and used in another program that places the object in a specified geo-referenced model of the current scene.

In another embodiment of an available software algorithm, Program 164 in suite 160, a user may operate a program that is configured to determine and visually display differences between the scanned captured model and a pre-existing model. This is particularly useful for comparing the as-built condition of a structure or object with the desired design specification.

In an embodiment of an available software algorithm, program 165, a user may operate a program configured to perform a transform of captured data for a particular scene to an externally provided model of a desired design for such a scene. With this program, the newly captured scene data may be matched to the design coordinate reference frame.

In another embodiment of an available software algorithm, a user may operate a program configured to perform real-time data streaming via a communications link, Program 166, to a remote storage facility, or to a remote computer for display and manipulation by another person. This operation enables joint sharing of instant image data, for improved workflow involving making changes, taking new image capture operations, and sharing observations about the results. The communications link may be configured to include voice communications as well as the image data communications. This type of communications-based image/operational information sharing enables a central manager to supervise and review one or more remote data collection operations in real time or near-real-time. Additional features include the ability to direct data transfers from and to other image capture devices as may be associated with a given handheld computer system.

In another embodiment of an available program, Program 167, one or more basic RGB-D images may be transmitted directly without performing an integration of the RGB-D frames into a 3d model in the capturing computer. Instead the model creation may be carried out remotely at a Cloud-based server and made available to other interested parties via cloud access. This transmission and conversion process may be done in real time as the data is collected. Alternatively it may be done in a post-processed operation, and any or all of the data may be extracted from a storage facility, locally on the tablet, or stored in a remote storage facility such as a cloud-based service, and manipulated in a remote location by another interested party.

In addition, in an embodiment, one or more basic RGB-D frames may be compressed and streamed to a remote location for storage and further processing, as described above. In another embodiment, the program is configured to enable the user to select individual frames for transmission to the remote facility for storage or viewing and manipulation. In yet another embodiment, a program 168 is available for providing a registration geo-reference point to incorporate and match to a selected location point in a captured image.

In another embodiment, an available program 169 is configured to extend and fill in an existing 3D model with newly recorded 3D data. The new data is manipulated by the software algorithm so that it blends seamlessly with the pre-existing data. In another embodiment, a program 170 is available to extract surface angles from captured RGB-D imagery in real-time and to provide immediate visualization of the surface angles. The program is further configured to create an augmented-reality (AR) form for the display of the angles.

The Handheld Portable Computer: Tablet, Smartphone, or Notebook

The handheld computer as described above may comprise a tablet computer of the kind available from Apple Computer, ASUS, Samsung, Blackberry, Microsoft, and the like. The handheld computer may comprise a Smartphone of the type offered by Apple Computer, Samsung, Nokia, HTC, Blackberry, and the like. The handheld computer may comprise a Notebook type of portable computer with a suitable form factor for handheld operation and manipulation, such as provided by ASUS, Sharp, HP, Dell, and the like. The handheld computer may be configured to record and display data from one or more image capture devices, sequentially or simultaneously.

A display software program 171 is available to provide one or more graphical user interfaces for operating the various programs cited previously. Graphical user interfaces (GUIs) may be embedded in each of the operating programs. Housekeeping functions such as changing a view point for a model, trimming or extending the data, converting between formats, seeking and displaying additional information, running simulations, are included. Program 172 is configured to provide and manage on-screen images for Post-Capture visualization.

Program suite 190 is configured to provide a calibration suite of programs for calibrating the imager. It contains Program 191 for calibration of projective images, and Program 192 for calibration of depth for structured light systems.

Flow Charts

Figure 3:
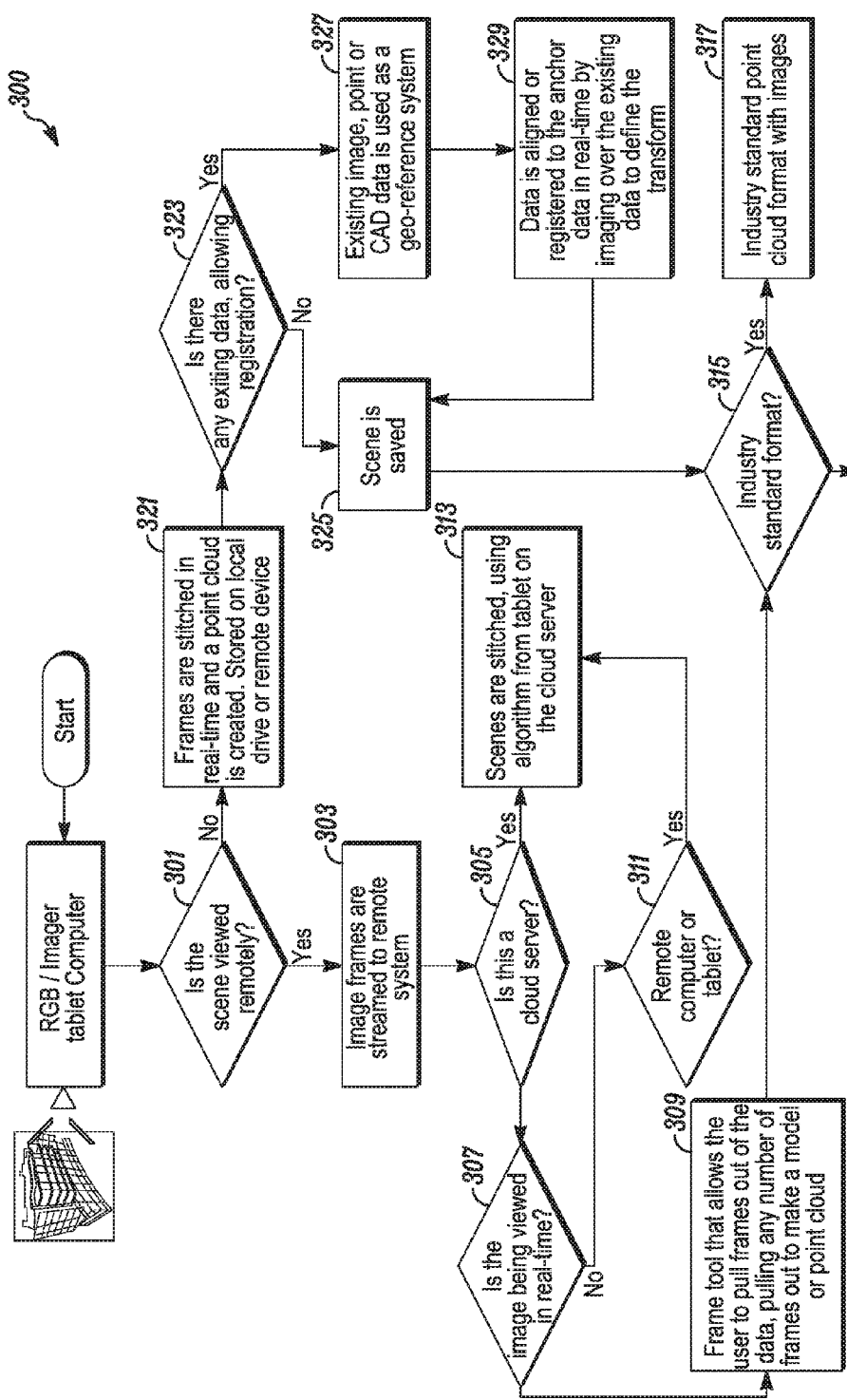
FIG. 3 depicts a flowchart for operational use of the present disclosure.
Figure 3:
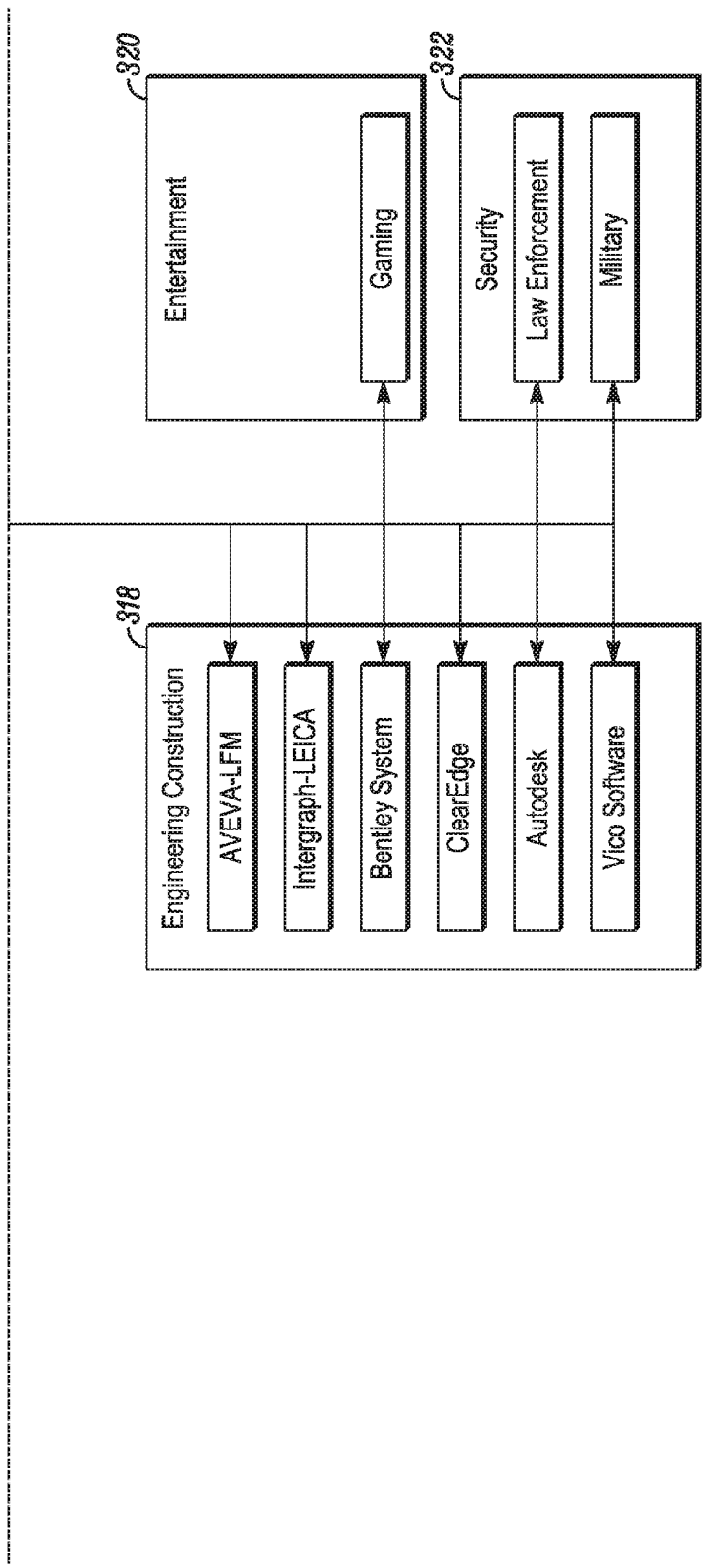

FIG. 3 depicts a flow chart 300 demonstrating a workflow for multiple operations of the imager/computer system, in a typical field operation. The real-time capture and manipulation made possible by the combination of fast hardware and fast software make all the steps recited in FIG. 3 possible. The start of the work flow begins, in this example, with an RGB/Image capable tablet computer, or other suitable digital imager. If the scene of interest is viewed 301 remotely, the image frame(s) are streamed 303 to a remote system. If the remote is a cloud server 305, the scene or scenes are combined 313, using an algorithm from a remote tablet or computer on the cloud server. If the image is not being viewed 311 in real time, e.g., the user is working with stored data, still with a remote system 311, the scenes or images are combined 313, as noted, using the algorithm from a tablet or other suitable computer on the cloud server. The images may then be used as is or subjected to further post-processing. If the image is being viewed in real time 307, a frame tool is used that allows the user to pull frames out of the data, pulling out the desired number of frames to make a model or point cloud 309 for the desired image or images. The images preferably conform to industry standard formats 315. If the images do conform, the data may be saved using 317 industry-standard point-cloud formats for the images. As noted in FIG. 3, these may include a number of engineering/construction formats 318, entertainment formats 320, such as gaming formats, or security formats 322, such as those for law enforcement or the military.

If the user, on the other hand, is present at the scene, then frames or images are combined in real time 321 and 3-D model is created and stored locally or on a remote drive. If additional processing is desired, such as for creating composite images or for manipulating the images, a check may be made 323 as to whether data exists, e.g., position or location data, that would allow registration of the image or images, such as to allow stitching. If not, the scene or image is saved as is 325. If data exists that would allow registration, then one or more existing images, scenes, points or CAD data is used as a geo-reference system 327. The data is then aligned or registered to the base or anchor data in real time by imaging over the existing data to define a transform 329, and the data is then saved 325. Reference systems include but are not limited to: GPS, WGS-84 and NAD83. Reference systems may also include local northing and easting, such as from a county reference system, and may also include any convenient datum, such as a local on-site reference spot, like the cornerstone of a new building, the pupils of a person's eyes, and the like.

Figure 4B:
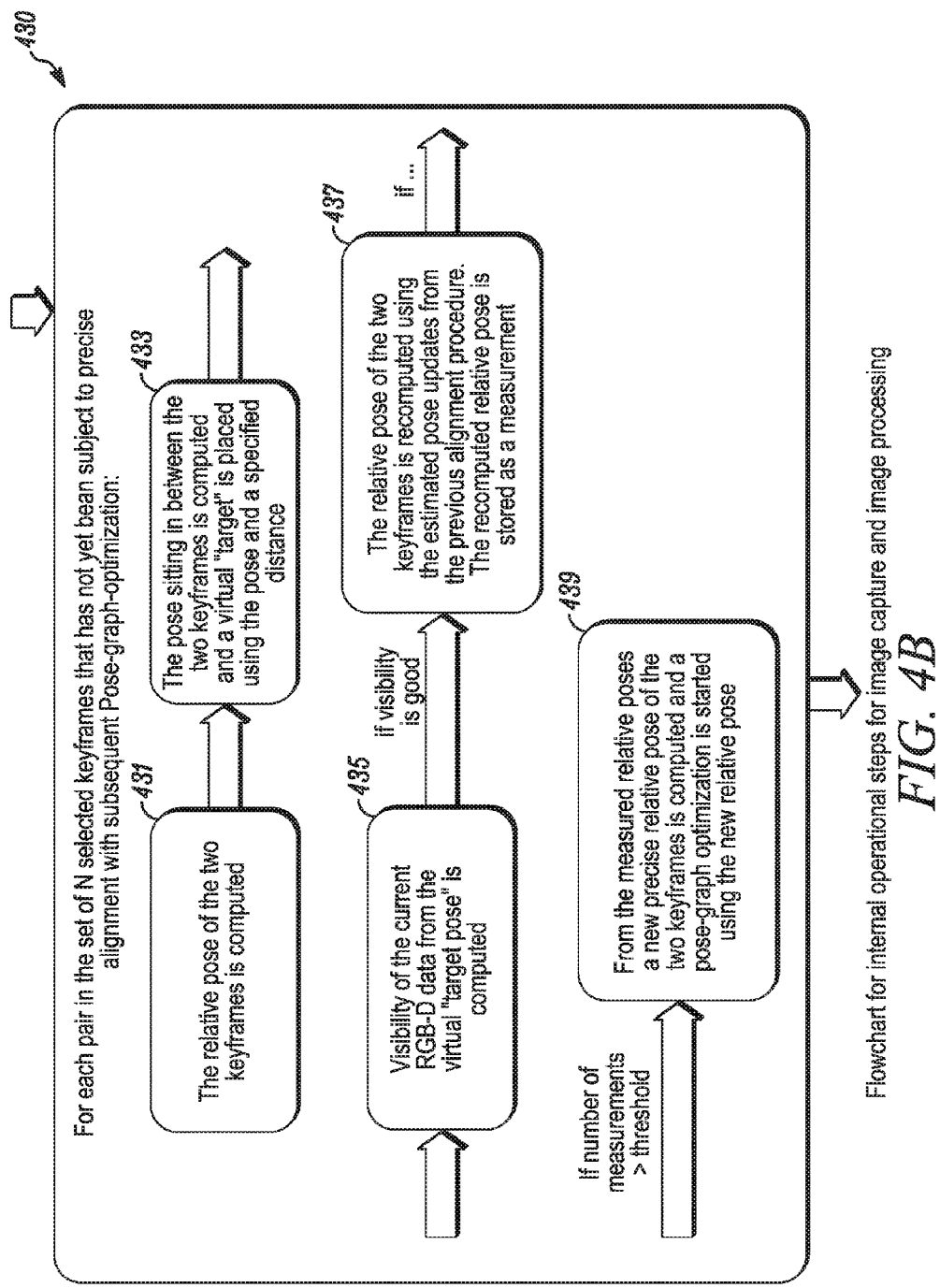

Additional flowcharts for image processing are also detailed in FIGS. 4A-4D. In FIG. 4A, steps are disclosed for internal operations for image capture and processing. The process 400 for FIG. 4A includes a first step 401 in which a new RGB-D frame has been taken and is available for processing. The depth may be corrected 402 according to the camera calibration. Grey values are created or extracted 403 from the image color channels and image pyramids are created 404 for both the grey channel and the depth channel. In the next step, the structure of the current RGB-D frame is analyzed 405, using a coarser pyramid value if speed is desired. A scene fitness value is computed. A fitness value describes the system's ability to perform real-time frame alignment using the given RGB-D frame. The current camera pose is predicted 406 using a visual predictor, data from a system gyroscope or a linear motion model. A pose is a position and orientation in space, such as a camera pose for example, with its tilt angle and compass direction, or a keyframe pose. Then, a set of N exiting keyframes is selected 407 for alignment with the estimation of the current camera pose. The next steps are taken in parallel, with data for visualization and noise reduction uploaded 408 to the graphics processor unit (GPU). At the same time, the current RGB-D frame is aligned 409 to each of the keyframes in the selected set, using the predicted pose as a starting point. The result of this step is the desired number (N) of pose updates, one for each keyframe in the set, and the same number, N, of overlap values between the current RGB-D frame and the particular keyframe.

Another part of a process for image capturing and image processing is disclosed in FIG. 4B. This process or procedure uses past measurements of relative keyframe poses (their position and orientation in space) and sets them in relation to each other (constraint building) in order to derive a set of new poses for the keyframes that is more consistent with respect to the internal constraints. This process 430 applies to each pair of frames in the N selected keyframes that has not yet been precisely aligned with subsequent pose-graph optimization. The first step 431 is to compute the relative pose of the two keyframes so that they can be precisely aligned. The pose sitting between the two keyframes is thus computed and virtual target is placed 433 using the pose and a specified distance. The visibility of the current RGB-D data from the virtual target pose is then computed 435. If the fit or visibility of the target pose is acceptable, the relative pose of the two keyframes is then recomputed 437 using the estimated pose updates from the previous alignment procedure, and the recomputed relative pose is stored as a measurement. If the number of measurements is greater than a predetermined threshold, then a new, precise relative pose of the two keyframes is computed 439 and a pose-graph optimization is started using the new relative pose.

Figure 4C:
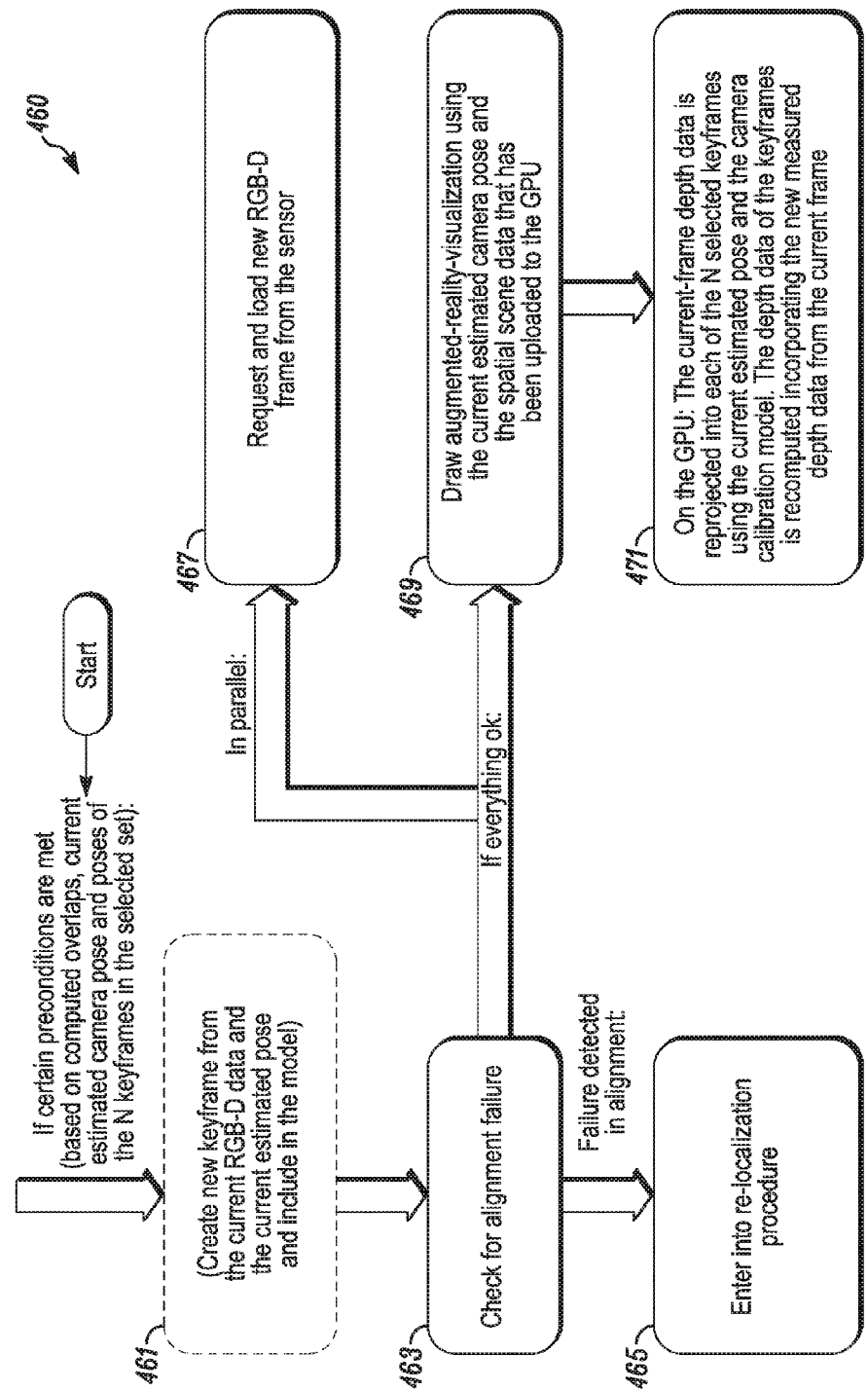

A third flowchart 460 for another part of the method for image capture and image processing is depicted in FIG. 4C. This process may be used if certain preconditions are met, based on computer overlaps, current estimated camera pose, and poses of the N keyframes in a selected set. In the first step, a new keyframe is created 461 from the current RGB-D data and the current estimated pose, and is included in the model. Alignment is checked 463. If there is a failure of alignment, the keyframes should be relocalized 465 and the procedure re-started. If alignment is correct and all is well, then in parallel, two steps should take place. A new RGB-D frame should be requested and loaded 467 from the sensor for the next frame. In addition, an augmented-reality visualization is drawn 469 using the current estimated camera pose and the spatial scene data that has been uploaded to the GPU. Subsequently, on the GPU, the current frame depth data is reprojected 471 into teach of the N selected keyframes, using the current estimated pose and the camera calibration model. The depth data of the keyframes is recomputed incorporating the new measured depth data from the current frame.

Figure 4D:
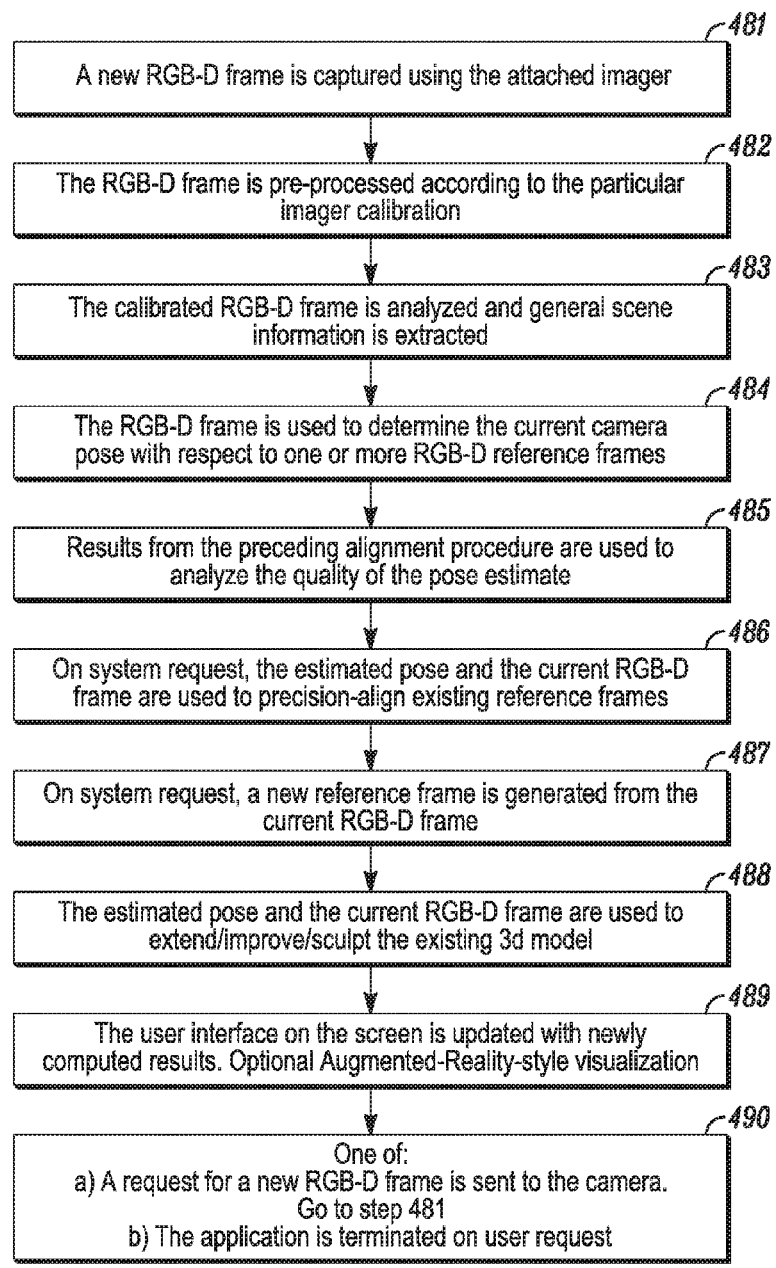

A fourth flowchart is depicted in FIG. 4D. This is an abbreviated, alternate process for steps for image capture and image processing. A first step is to capture 481 a new RGB-D frame using the imager. The captured RGB-D frame is pre-processed 482 according to the particular imager calibration. The calibrated RGB-D frame is then analyzed 483 and general scene information is extracted. The frame is then used to determine 484 the current camera pose or orientation with respect to one or more RGB-D reference frames, that is, to align the frame. The results of the alignment are then used to analyze 485 the quality of the pose estimate. On system request, the estimated pose and the current RGB-D frame are then used to precision align 486 existing reference frames, and a new reference frame is then generated 487 from the current RGB-D frame. The estimated pose and the current RGB-D frame are then used to extend, improve and/or sculpt 488 the existing 3D model. The user interface on the screen is then updated 488 with the newly computed results. The results may be used for optional augmented reality style visualization with suitable equipment. In addition, the process may be repeated 490 as often as desired for better alignment.

Closeup Utility for Human Physiognomy

In an embodiment, the integrated 3D imager can be used to capture and provide measurements of human or animal physiognomy. Measurements for eyeglasses and contacts can easily be obtained with millimeter accuracy. Detailed maps of the head, the cornea, eyes, ears, and the like may be captured in a few seconds. Similarly, 3D imagery of other body parts may be obtained, for use in making prosthetics, or for use by plastic surgeons in creating models for making adjustments to one's physiognomy or for providing surgical repair for accidents or other damages.

As an example of a typical operation, one may first measure the eyes and nose of a person. From that information, the separation between eyes, the interpupillary distance, can be found. The shape and size of the nose can be found. The location and size of the ears relative to the location of the eyes and nose can be found, including the distances, so a pair of eyeglass temples can be specified. Models of eyeglass frames may be selected by a buyer from a catalog. Digitally stored 3D models of the frames can be overlaid in the image to check for fit and to see if they suit the buyer. Such a service could be an aid to selling eye care products. In another embodiment, the image of the person's face can be inverted so that the person sees what he would see in a mirror.

General Principles

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law. While the disclosure has been described in connection with certain preferred embodiments, other embodiments would be understood by one of ordinary skill in the art and are encompassed herein.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic coprocessor, communication co-processor and the like) and the like that may directly or indirectly facilitate execution of program code or program instructions stored thereon. In addition, the processor may enable execution of multiple programs, threads, and codes.

If more than one processing core is available, the threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs, non-transitory data, as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die). The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a non-transitory storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another. The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law. All documents referenced herein are hereby incorporated by reference.

What is claimed is:

1. An imaging system for creating a digital 3D model of the environment by capturing a plurality of images of a scene, in real time, comprising:
   an image/depth capture module for capturing a plurality of digital images to obtain depth information and color information comprising RGB-D data, wherein the RGB-D data is obtained for a corresponding plurality of pixels for each captured digital image of the plurality of digital images;
   a computer system having a processor, wherein the processor is in communication with the image/depth capture module; and
   a non-transitory computer readable medium having encoded thereon a set of instructions executable by the processor to perform one or more operations, comprising:
   capturing the plurality of digital images of a scene;
   utilizing an initial digital image of the plurality of digital images captured by the image/depth capture module to initialize a 3D model with an initial keyframe comprising RGB-D data and a corresponding pose;
   computing, using the RGB-D data, an estimate of a corresponding relative position and orientation (pose) for the image/depth capture module at a corresponding time of capture for each captured digital image of the plurality of captured digital images acquired from the image/depth capture module subsequent to utilizing the initial digital image of the plurality of digital images to initialize the 3D model, wherein the estimates are computed by sequentially registering, using a corresponding initial predicted pose, each captured digital image of the plurality of captured digital images against at least a subset of keyframes of the 3D model represented digitally on the non-transitory computer readable medium using a process that aligns the RGB-D data of a captured digital image with 3D digital data of the 3D model subset;
   extending the 3D model with a corresponding keyframe with corresponding pose that is created for each captured image of the plurality of captured digital images using the corresponding relative pose estimate for that captured image if specified criteria relating to overlap values and the poses of the subset of keyframes of the 3D model are met;
   using the estimates of poses, the depth information, and the color information of those captured digital images of the plurality of captured digital images which have been used to initialize the 3D model and to extend the 3D model with a plurality of keyframes, and that together represent the 3D model, as inputs to a mathematical global optimization process which optimizes the input poses and the depth information of the keyframes of the 3D model by global registration of the keyframes of the 3D model with each other, thereby increasing an accuracy and optical quality of the 3D model.

2. The system of claim 1, wherein the processor is any one of a programmable digital signal processor, microprocessor, embedded microcontroller, an application specific integrated circuit, a programmable gate array, a programmable array logic or any combination thereof.

3. The system of claim 1, wherein the image/depth capture module has a working range of 0.1-10 m.

4. The system of claim 1, wherein the image/depth capture module obtains images at a user-selectable rate, wherein the user-selectable rate is in a range from 8 frames per second to 60 frames per second.

5. The system of claim 1, wherein the image/depth capture module is configured to capture a user-selectable data set wherein a range is from 100,000 to 2 million data points per image.

6. The system of claim 1, wherein a) the image/depth capture module produces the computed pose estimation for each captured digital image in real time and b) the extended 3D model is generated and formed in real-time and c) display of scan-related information to a user is updated in real-time.

7. The system of claim 1, wherein the image/depth capture module comprises a structured light projection and comparison system or a time of flight system, for determining X, Y, and Z location information relative to a location of the image/depth capture module.

8. The system of claim 1, wherein the processor is configured to operate a program to overlay an Augmented Reality image and adjust the alignment of the Augmented Reality image relative to the image it is overlaid on.

9. The system of claim 1, wherein the processor is configured to display the 3D model and enable a user to manipulate the 3D model by at least one of changing a view point for the 3D model, trimming the 3D model, extending the 3D model, converting between formats of the 3D model, seeking and displaying additional information on the 3D model, and running simulations using the 3D model.

10. The system of claim 1, further comprising, using the estimated computed pose of a subsequent captured digital image for refining the 3D model by merging new points from the subsequent captured digital image with the 3D model.

11. The system of claim 10, further comprising, extending the 3D model by transforming corresponding locations of new points from at least one of a plurality of the subsequent captured digital images captured subsequent to the initial digital image into a coordinate system of the 3D model by using the subsequent captured digital image's corresponding estimated pose, and adding the new points into the 3D model.

12. The system of claim 1, wherein the set of instructions executable by the processor further includes:
   using one or more geo-reference points and their corresponding location points in the captured images as additional inputs to the mathematical global optimization process to further optimize the input poses and depth information of the keyframes of the 3D model by globally registering corresponding geo-reference points with each other or with their known 3D location as part of the mathematical global optimization process.

13. A method for creating a digital 3D model of the environment by capturing a plurality of images of a scene and determining a location of a plurality of points in each image in a coordinate system, in real time, the method comprising:
   capturing a plurality of digital images of a scene by an image/depth capture module to obtain corresponding depth information and color information comprising RGB-D data, wherein the RGB-D data is obtained for a corresponding plurality of pixels for each captured digital image of the plurality of digital images;
   utilizing an initial digital image of the plurality of digital images captured by the image/depth capture module to initialize a 3D model with an initial keyframe comprising RGB-D data and a corresponding keyframe pose;
   computing, using the RGB-D data, an estimate of a corresponding position and orientation (pose), at a corresponding time of capture for each of the plurality of captured digital images captured subsequent to utilizing the initial digital image of the plurality of digital images to initialize the 3D model, wherein the estimates are computed by sequentially registering, using a corresponding initial predicted pose, each of the plurality of captured digital images against at least a subset of keyframes of the 3D model represented digitally on non-transitory computer readable medium, using a process that aligns the corresponding RGB-D data of a captured digital image with 3D digital data of the 3D model subset;
   extending the 3D model with a corresponding keyframe with corresponding pose that is created for each captured image of the plurality of captured digital images using the corresponding relative pose estimate for that captured image if specified criteria relating to overlap values and the poses of the subset of keyframes of the 3D model are met;
   using the estimates of poses, the depth information, and the color information of those captured digital images of the plurality of captured digital images which have been used to initialize the 3D model and to extend the 3D model with a plurality of keyframes, and that together represent the 3D model, as inputs to a mathematical global optimization process which optimizes the input poses and the depth information of the keyframes of the 3D model by global registration of keyframes of the 3D model with each other, thereby increasing an accuracy and optical quality of the 3D model; and
   displaying a rendering of the plurality of captured digital images as a visualization of the 3D model in an imaging system.

14. The method of claim 13, further comprising manipulating the 3D model according user-based inputs to a processing and control system.

15. The method of claim 13, wherein extending the 3D model occurs by transforming the location of new points from at least one of the captured digital images captured subsequent to the initial digital image into a coordinate system of the 3D model by using the subsequent captured digital image's estimated pose, and adding the new points into the 3D model if the overlap of the subsequent captured digital image with the 3D model falls below a threshold.

16. The method of claim 13, wherein the color information is grey scale information.

17. The method of claim 13, further comprising using one or more geo-reference points and their corresponding location points in the captured images as additional inputs to the mathematical global optimization process to further optimize the input poses and depth information of the keyframes of the 3D model by globally registering corresponding geo-reference points with each other or with their known 3D location as part of the mathematical global optimization process.

18. A method for creating a digital 3D model of the environment by capturing a plurality of images of a scene and determining a precise location of a plurality of points in each image in a coordinate system, in real time, the method comprising:
   capturing a plurality of digital images of a scene by a single image/depth capture module to obtain corresponding depth information and color information comprising RGB-D data, wherein the RGB-D data is obtained for a corresponding plurality of pixels for each captured digital image of the plurality of digital images;
   utilizing an initial digital image of the plurality of digital images captured by the image/depth capture module to initialize a 3D model with an initial keyframe comprising RGB-D data and a corresponding keyframe pose;
   computing, using the RGB-D data, an estimate of a corresponding position and orientation (pose), at a corresponding time of capture for each of the plurality of captured digital images captured subsequent to utilizing the initial digital image of the plurality of digital images to initialize the 3D model, wherein the estimates are computed by sequentially registering, using a corresponding initial predicted pose, each of the plurality of captured digital images against at least a subset of keyframes of the 3D model including at least two keyframes represented digitally on non-transitory computer readable medium using a process that aligns the corresponding RGB-D data of a captured digital image with 3D digital data of the 3D model subset; and
   extending the 3D model with a corresponding keyframe with corresponding pose that is created for each captured image of the plurality of captured digital images using the corresponding relative pose estimate for that captured image if specified criteria relating to overlap values and the poses of the subset of keyframes of the 3D model are met.

19. The method of claim 18, further comprising:
   using the estimates of poses, the depth information, and the color information of those captured digital images of the plurality of captured digital images which have been used to initialize the 3D model and to extend the 3D model with a plurality of keyframes, and that together represent the 3D model, as inputs to a mathematical global optimization process which optimizes the input poses and the depth information and color information of the keyframes of the 3D model by global registration of the keyframes of the 3D model with each other, thereby increasing an accuracy and optical quality of the 3D model.

20. The method of claim 19, further comprising:
displaying a rendering of the plurality of captured digital images as a visualization of the 3D model.

* * * * *

UNITED STATES PATENT AND TRADEMARK OFFICE
CERTIFICATE OF CORRECTION

PATENT NO.        : 10,448,000 B2
APPLICATION NO.   : 15/079367
DATED             : October 15, 2019
INVENTOR(S)       : Mark Klusza et al.

Page 1 of 1

It is certified that error appears in the above-identified patent and that said Letters Patent is hereby corrected as shown below:

In the Drawings

On sheet 7 of 10, in Figure 4B, Line 1, delete "bean" and insert -- been --, therefor.

In the Specification

In Column 6, Line 19, delete "(UI}" and insert -- (UI) --, therefor.

Signed and Sealed this
Seventeenth Day of December, 2019

Andrei Iancu
*Director of the United States Patent and Trademark Office*